(12) United States Patent
Randall

(10) Patent No.: US 7,906,931 B2
(45) Date of Patent: Mar. 15, 2011

(54) CONTROL OF A SWITCHED RELUCTANCE MACHINE

(75) Inventor: Steven Paul Randall, Leeds (GB)

(73) Assignee: Switched Reluctance Drives Limited, North Yorkshire (GB)

( * ) Notice: Subject to any disclaimer, the term of this patent is extended or adjusted under 35 U.S.C. 154(b) by 417 days.

(21) Appl. No.: 11/998,131

(22) Filed: Nov. 28, 2007

(65) Prior Publication Data

US 2008/0129244 A1    Jun. 5, 2008

(30) Foreign Application Priority Data

Dec. 4, 2006   (GB) .................................. 0624210.1

(51) Int. Cl.
*H02P 1/46* (2006.01)

(52) U.S. Cl. ............... 318/700; 318/701; 310/154.45

(58) Field of Classification Search .............. 318/700, 318/701, 721, 432; 310/154.45, 154.48, 310/156.02, 156.07
See application file for complete search history.

(56) References Cited

U.S. PATENT DOCUMENTS

| | | | | |
|---|---|---|---|---|
| 4,883,999 A | * | 11/1989 | Hendershot | 310/216.071 |
| 5,767,638 A | * | 6/1998 | Wu et al. | 318/400.23 |
| 5,825,112 A | * | 10/1998 | Lipo et al. | 310/181 |
| 5,936,373 A | * | 8/1999 | Li et al. | 318/701 |
| 6,087,799 A | * | 7/2000 | Turner | 318/701 |
| 6,130,494 A | * | 10/2000 | Schob | 310/90.5 |

FOREIGN PATENT DOCUMENTS

| | | |
|---|---|---|
| EP | 0 886 370 A2 | 12/1998 |
| EP | 1 398 870 A1 | 3/2004 |

OTHER PUBLICATIONS

Lafoz et al., "A 200 kVA prototype of Kinetic Energy Storage System based on Switched Reluctance Machine Technology", 11th European Conference on Power Electronics and Applications (EPE2005), Sep. 11-14, 2005, Dresden Germany, Paper 225, pp. 1-8.
Stephenson, et al., "The Characteristics, Design and Applications of Switched Reluctance Motors and Drives," PCIM '93 Conference & Exhibition, Nürnberg, Germany, Jun. 21-24, 1993, Title page and pp. 1-31, 33-34 and 35-68.
Lawrenson, et al., "Variable-speed switched reluctance motors," IEE Proc., vol. 127, Pt. B. No. 4, Jul. 1980, pp. 253-265.
Oh, et al., "Two Phase SRM With Flux Reversal Free Stator: Concept, Analysis, Design and Experimental Verification," IEEE, 2006, 8 pages.

* cited by examiner

*Primary Examiner* — Rina I Duda
(74) *Attorney, Agent, or Firm* — Haynes and Boone, LLP

(57) ABSTRACT

The windings of a switched reluctance machine are supplied from a converter which is capable of providing bipolar energization. The energization pattern supplied to the windings is dependent on the number of stator and rotor poles in the machine and is selected to produce unipolar energization in the rotor poles. This in turn reduces the losses in the rotor which would otherwise result from bipolar energization. The machine may also be operated to provide energization patterns which are adapted to provide optimum performance in different parts of its operating speed range.

11 Claims, 8 Drawing Sheets

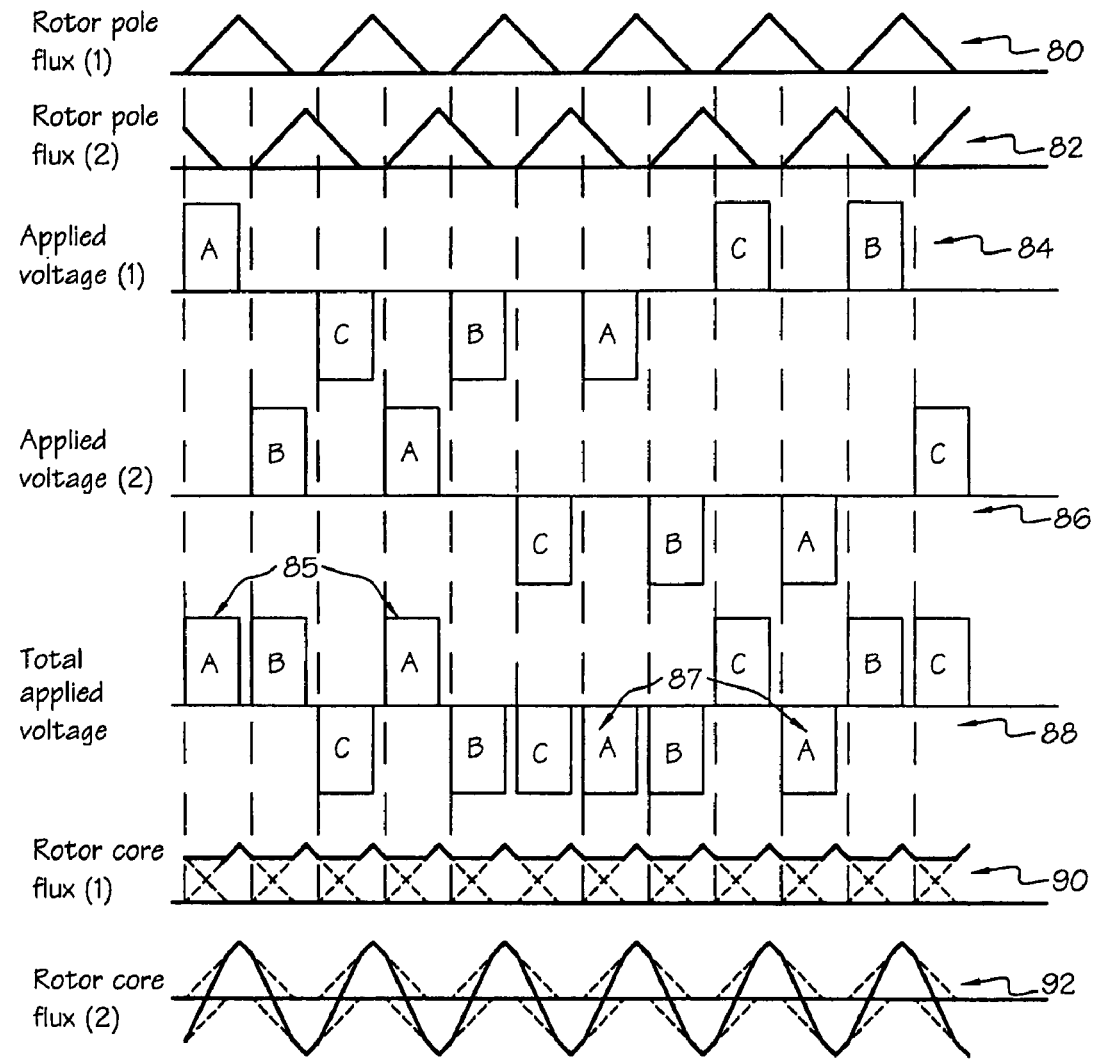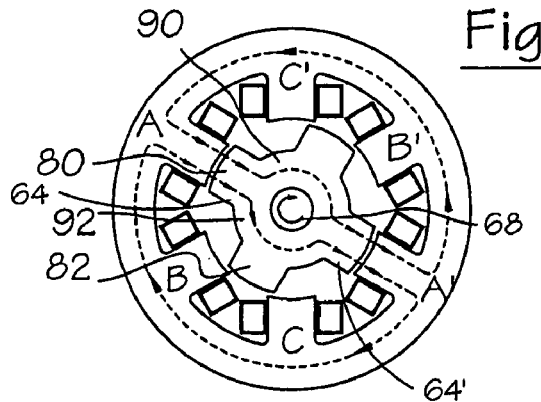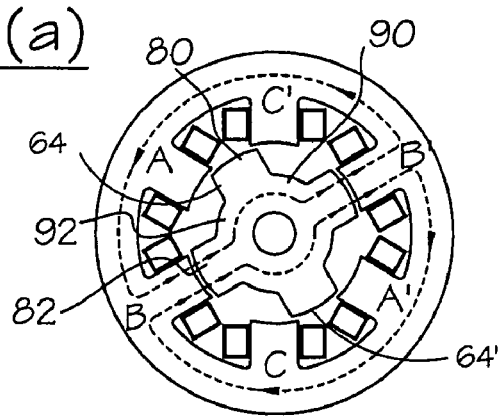
Fig 8(a)
Fig 8(b)
Fig 8(c)

CONTROL OF A SWITCHED RELUCTANCE MACHINE

The present invention generally relates to a method of controlling a reluctance machine. More particularly, but not exclusively, the present invention relates to the operation of a switched reluctance machine by using an energisation pattern which reduces the iron loss in the rotor.

The characteristics and operation of switched reluctance systems are well known in the art and are described in, for example, "The characteristics, design and application of switched reluctance motors and drives" by Stephenson and Blake, PCIM'93, Nürnberg, 21-24 Jun. 1993, incorporated herein by reference. FIG. 1(a) shows a typical switched reluctance drive in schematic form, where the switched reluctance machine 12 is connected to a load 19. The DC power supply 11 can be rectified and filtered AC mains or a battery or some other form of electrical storage. The DC voltage provided by the power supply 11 is switched across the phase windings 16 of the machine 12 by a power converter 13 under the control of the electronic control unit 14. The switching must be correctly synchronised to the angle of rotation of the rotor for proper operation of the drive, and a rotor position detector 15 is typically employed to supply signals corresponding to the angular position of the rotor. The rotor position detector 15 may take many forms, including that of a software algorithm, and its output may also be used to generate a speed feedback signal. The presence of the position detector and the use of an energisation (commonly known as 'excitation') strategy which is completely dependent on the instantaneous position of the rotor leads to these machines having the generic description of "rotor position switched". The machines are characterised by being doubly salient, i.e., they have magnetic saliency on both stator and rotor, as illustrated in the Stephenson paper, above.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A low-value resistor 28 is connected in series with the lower switch to act as a current-sense resistor. A capacitor 25, known as the "DC link capacitor", is connected across the DC link to source or sink any alternating component of the DC link current (ie the so-called "ripple current") which cannot be drawn from or returned to the supply. In practical terms, the capacitor 25 may comprise several capacitors connected in series and/or parallel and, where parallel connection is used, some of the elements may be distributed throughout the converter.

FIG. 3 shows typical waveforms for an operating cycle of the circuit shown in FIG. 2 when the machine is in the motoring mode. FIG. 3(a) shows the voltage being applied at the "on angle" $\theta_{on}$ on for the duration of the conduction angle $\theta_c$ when the switches 21 and 22 are closed, thereby energising one of the phases. The flux linking the coil is the time integral of the voltage and, for the ideal case of zero winding resistance, ramps up linearly as shown. FIG. 3(b) shows the current in the phase winding 16 rising to a peak and then falling slightly. At the end of the conduction period, the "off angle" $\theta_{off}$ is reached, the switches are opened and the current transfers to the diodes, placing the inverted link voltage across the winding and hence forcing down the flux and the current to zero. At zero flux and zero current, the diodes cease to conduct and the circuit is inactive until the start of a subsequent conduction period. The current on the DC link reverses when the switches are opened, as shown in FIG. 3(c), and the returned current represents energy being returned to the supply. The shape of the current waveform varies depending on the operating point of the machine and on the switching strategy adopted. As is well-known and described in, for example, the Stephenson paper cited above, low-speed operation generally involves the use of current chopping to contain the peak currents, and switching off the switches non-simultaneously gives an operating mode generally known as "freewheeling".

As is well known in the art, switched reluctance machines can be operated in the generating mode. A typical arrangement is shown in FIG. 1(b), where the load 19 of FIG. 1(a) becomes the prime mover 19', supplying mechanical energy, and the power supply 11 becomes an electrical load 11', accepting net energy from the electrical machine 12 through the power converter 13. In general, the phase currents are mirror images (in time) of the phase currents in the motoring mode. Such systems are discussed in, for example, "Generating with the switched reluctance motor", Radun, Proceedings of the IEEE 9th Applied Power Electronics Conference, Orlando, Fla., 13-17 Feb. 1994, pp 41-47, incorporated herein by reference. FIG. 4(a) illustrates a flux waveform and the corresponding current waveform when the system is motoring and FIG. 4(b) illustrates the corresponding waveforms for generating. It will be seen from FIG. 4(b) that the machine requires a "priming" or magnetising flux to be established (along with the necessary current to support this flux) before the energy is returned to the DC link.

Though there are many topologies used for power converters for switched reluctance machines, all of them use a certain number of active switches, and these switches represent a significant portion of the cost of the converter. Much effort has been expended in developing cost-efficient circuits. It will be noted from the above explanation and figures that the current only requires to flow in one direction in the phase windings, i.e., "unipolar" energisation is all that is required. However, if alternating (or bipolar) energisation is available, that can also be used, since the torque produced by the machine is independent of the direction of current in the windings. EPA 0886370 (Turner), incorporated herein by reference, discloses a method of using half-bridge modules of switching devices which results in bipolar energisation of the phase windings of the machine. Similarly, EPA 1398870 (Tankard), incorporated herein by reference, discloses a method of using unequally rated switches for motoring and generating, which again results in bipolar energisation of the machine.

The losses in the operation of a reluctance machine can be split into three categories:

"electrical" loss, which appears as heat in the windings (and is often referred to as $I^2R$ loss);

"magnetic" loss, which appears as heat in the iron of the magnetic circuits of the stator and rotor (and is often called "iron" loss); and "mechanical" loss, which usually is taken to include the windage associated with driving the rotor through the surrounding air and the friction loss in the rotor bearings.

All of these losses produce heat which must be dissipated in some appropriate way. In some cases, natural convection and radiation will be sufficient to remove the heat generated by the losses and maintain the temperature of the machine within the required limits: in other cases more structured cooling methods are required to remove the heat.

There is a particular problem with the cooling of high-speed machines. For reasons of mechanical stress and rotor dynamics, it is important to keep the rotor as small as possible, but this generally leads to higher loss density in the rotor. In order to keep the windage loss at high speed to manageable levels, the rotor is often run in a partial vacuum, but this in turn increases the difficulty of removing the iron loss from the rotor, since convective heat transfer has been lost. Switched reluctance machines have a particular advantage in this circumstance, since they have no rotor windings, and hence no "electrical" loss associated with them. However, they have magnetic rotor loss which still requires careful management.

The present invention is defined in the accompanying independent claims. Preferred features of the invention are recited in the claims respectively dependent thereon.

At least some embodiments reduce the rotor loss in a switched reluctance machine.

According to embodiments there is provided a method of operating a reluctance machine having a stator defining stator poles, the stator having windings which are arranged as at least three separately energisable phases, and a rotor defining rotor poles, the method comprising: energising the windings such that the flux in each of the rotor poles is unipolar for successive energisations of the windings when the rotor poles are in substantial alignment with the energised stator poles.

The number of stator poles can vary but may be defined according to some embodiments as 2n being energised per phase, where n is a positive integer. In some embodiments, machines have an odd number of phases. An example of a machine has three phases, six stator poles and four rotor poles. This may be used with a phase energisation pattern of two energisation pulses of voltage of one polarity and two pulses of energisation of the other polarity.

In another example the machine, has four phases, eight stator poles and six rotor poles, and three pulses of phase energisation of one polarity followed by three pulses of energisation of the other polarity.

The invention is not limited to 3 and 4 phases, the machine may have q phases (q=three or more), wherein the energisation patterns of the stator windings are arranged such that a selected phase is energised according to one polarity for a number of energisations greater or less than q and then energised for the same number of energisations according to the other polarity. For example, it may be energised for one polarity for q−1 energisations and energised according to the other polarity for the subsequent q−1 energisations.

While the embodiments disclosed use unipolar flux in the rotor poles, the phases can be energised such that the flux in the stator is bipolar.

It is possible to change the sequence of energisation of the stator poles while the machine is operating.

In some embodiments the energisation is such that the polarities of the energised stator poles alternates between adjacent poles.

The energisation pattern of the stator poles can be grouped such that stator poles of like polarity are adjacent. Advantageously, the energisation pattern can be changed while the machine is operating.

Embodiments disclosed also relate to a method of operating a reluctance machine comprising energising the stator poles according to a first pattern of energisation polarities of the phases, changing the pattern of energisations while the machine is operating, and energising the windings according to a second pattern of energisation polarities of the phases.

These methods of operating can be applied particularly advantageously to doubly salient machines.

Other aspects and advantages of the invention will become apparent upon reading the following detailed description of exemplary embodiments of the invention and upon reference to the accompanying drawings, in which.

Figure 1A:
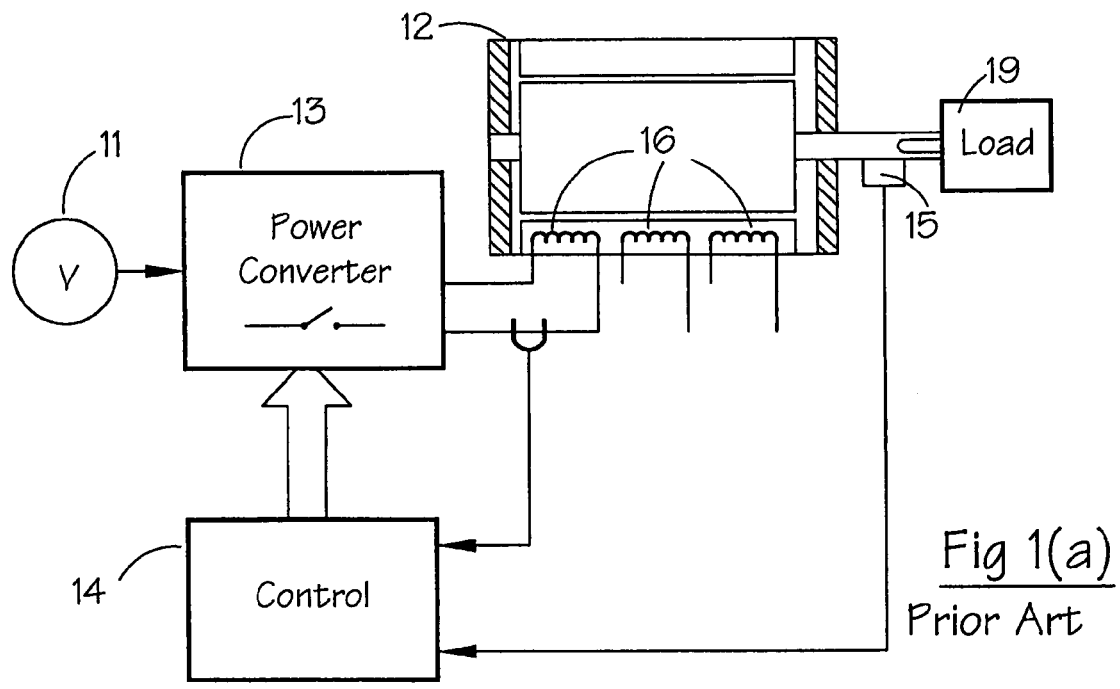
FIG. 1(a) is a schematic drawing of a prior art switched reluctance drive operating as a motor.
Figure 1B:
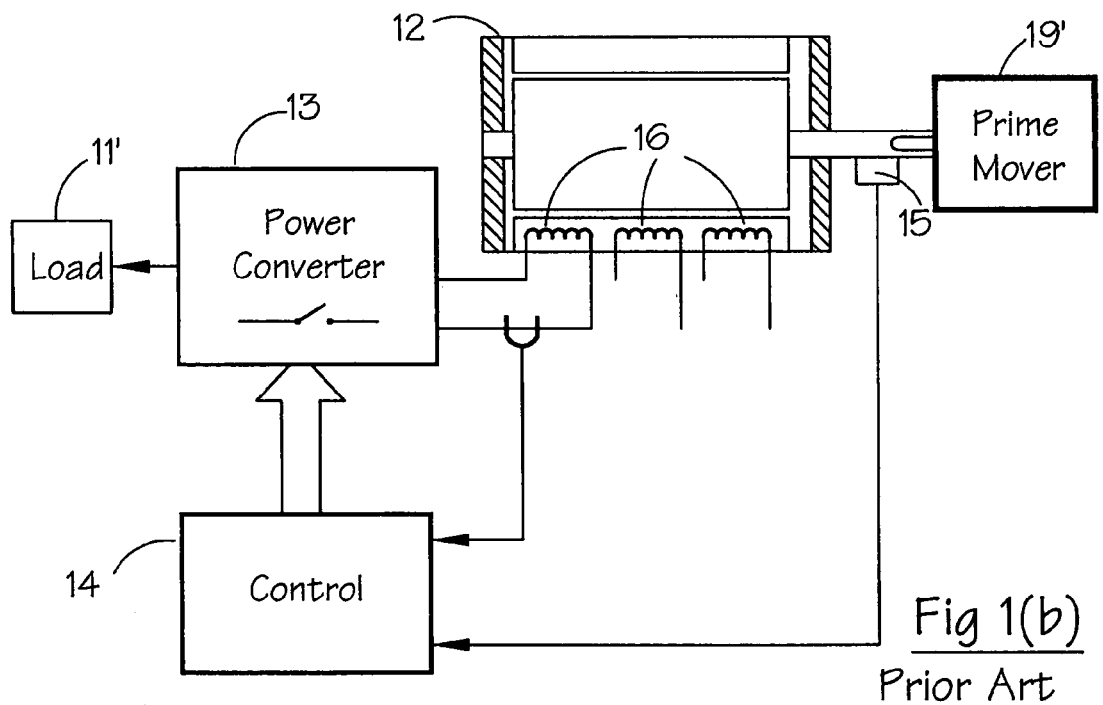
FIG. 1(b) is a schematic drawing of a prior art switched reluctance drive operating as a generator.
Figure 2:
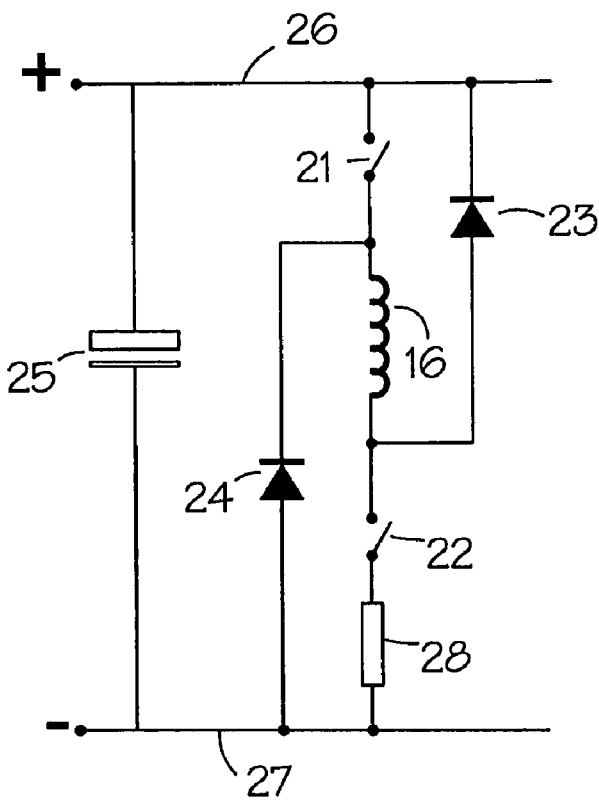
FIG. 2 is a prior art energisation circuit for one phase of the switched reluctance machine of FIG. 1.
Figure 4A:
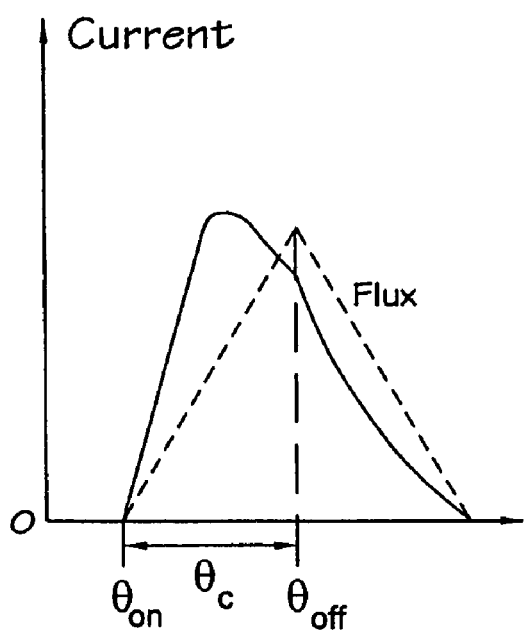
Figure 4B:
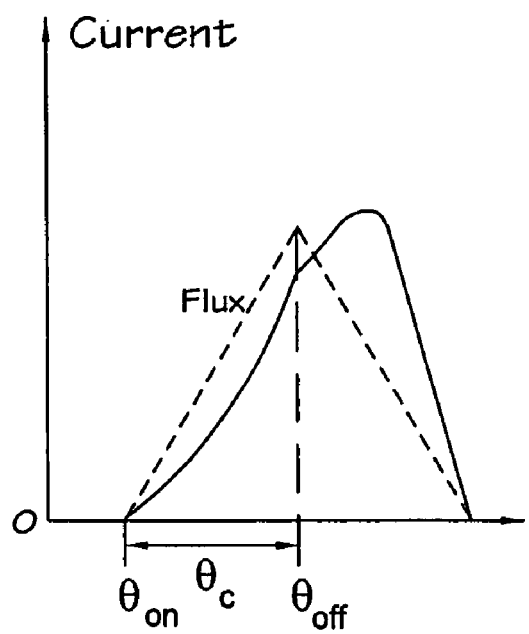
Figure 5:
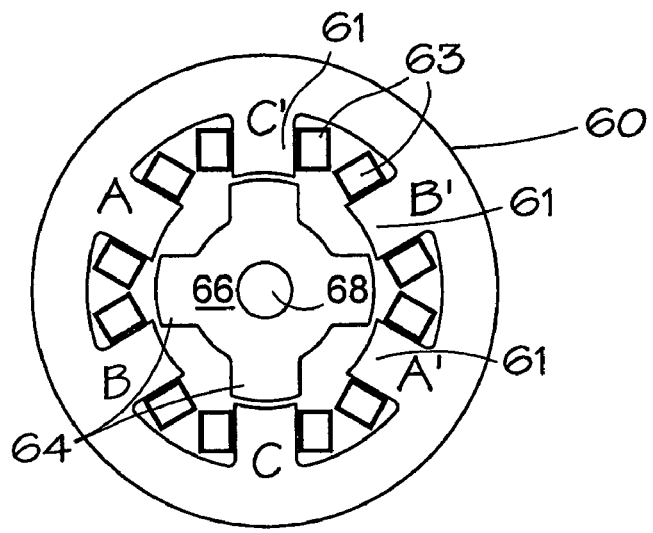
Figure 10:
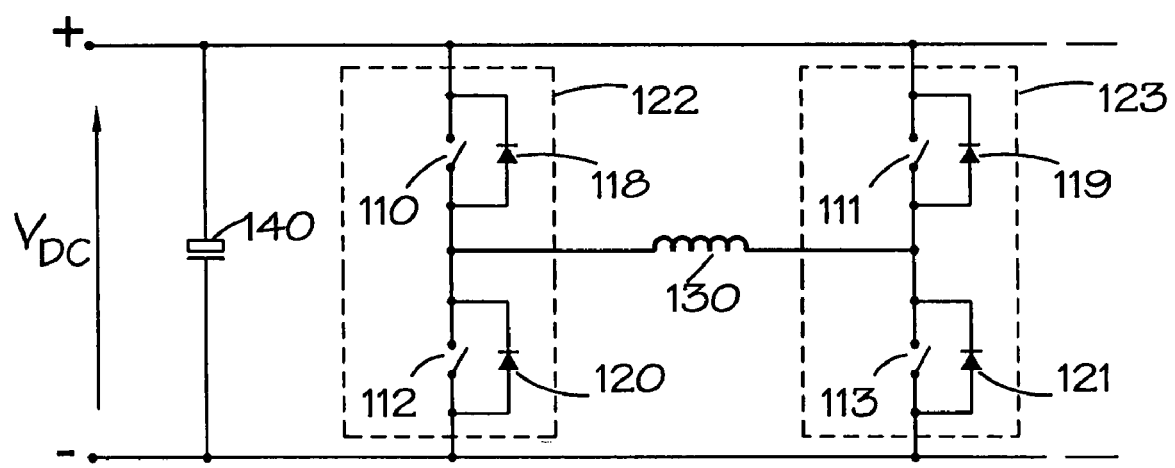
Figure 6:
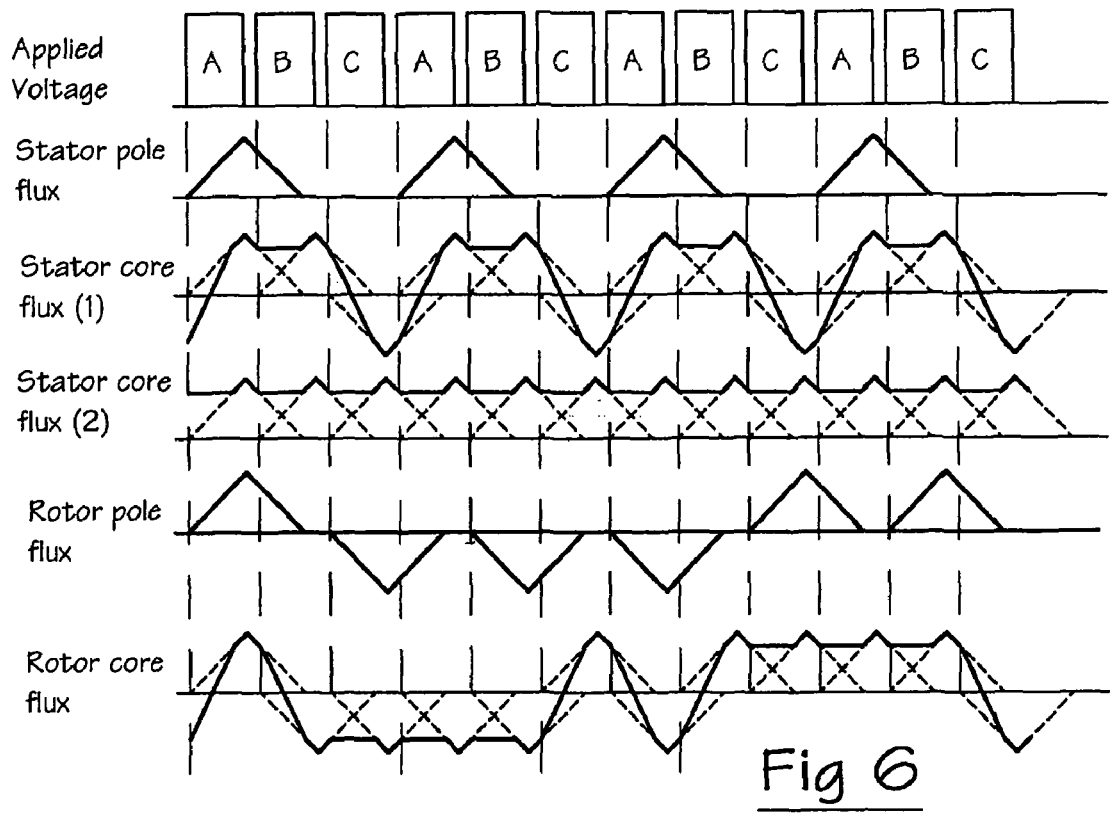
Figure 7:
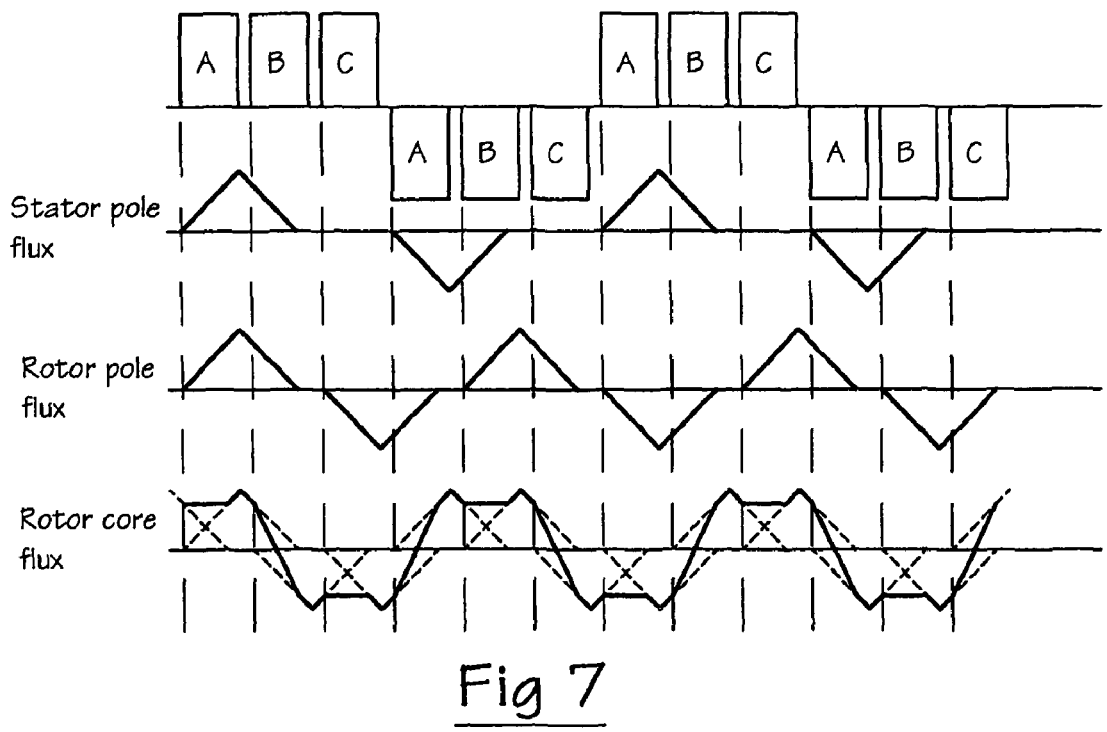
Figure 9:
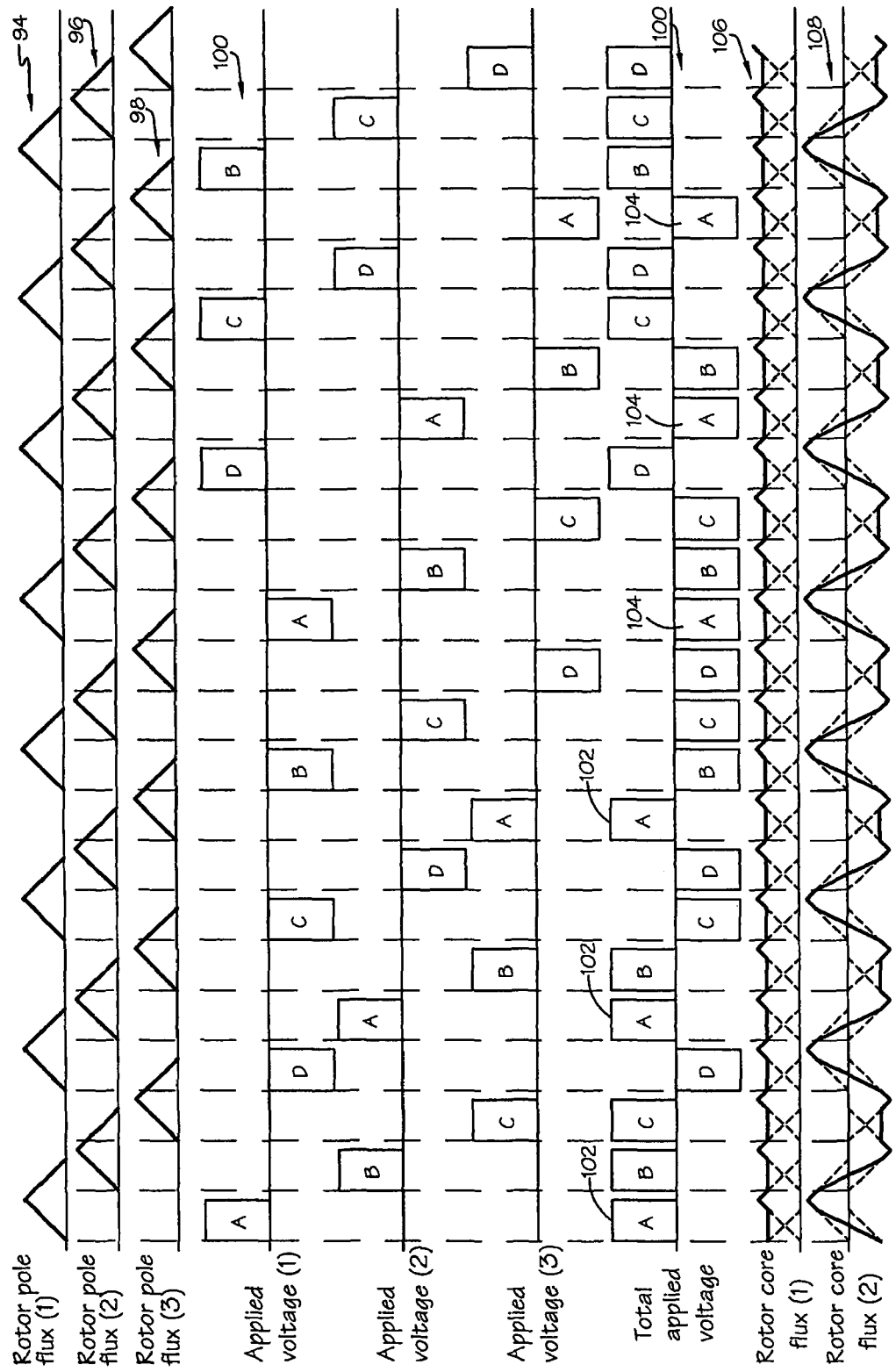
Figure 11:
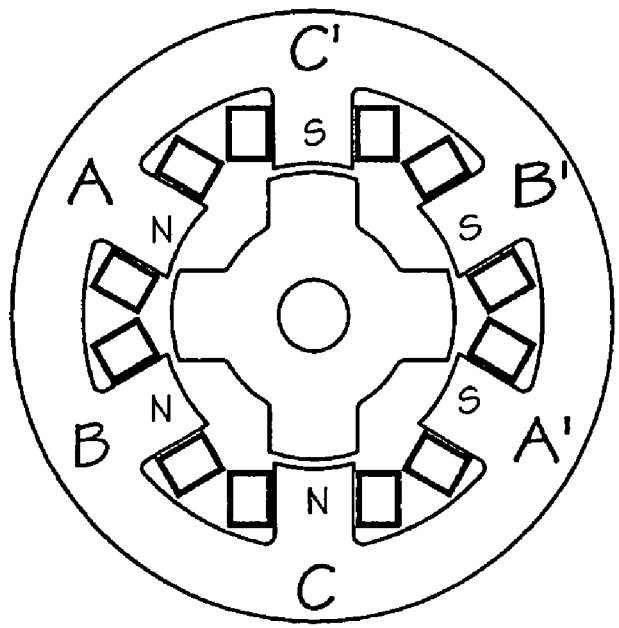

FIG. 4(a) and FIG. 4(b) show flux and current waveforms for motoring and generating respectively;

FIG. 5 shows a schematic view of the laminations and windings of a switched reluctance machine;

FIG. 6 shows flux waveforms for a 3-phase machine;

FIG. 7 shows flux waveforms for a bipolar-fed 3-phase machine;

FIG. 8(a) shows flux waveforms according to one embodiment;

FIG. 8(b) shows flux paths in an exemplary machine at one rotor position;

FIG. 8(c) shows flux paths in the machine of FIG. 8(b) at another rotor position;

FIG. 9 shows flux waveforms for another disclosed embodiment;

FIG. 10 shows part of a power converter suitable for use with embodiments;

FIG. 11 shows a connection schematic for a 3-phase machine; and

Figure 12:
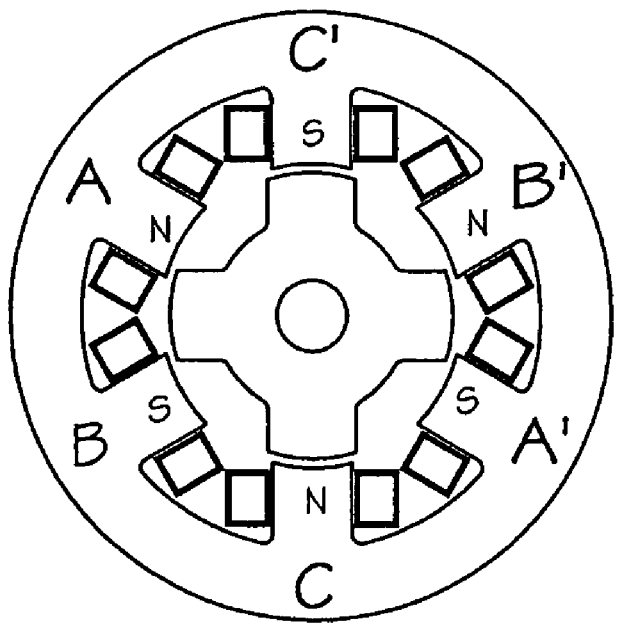

FIG. 12 shows another connection schematic for a 3-phase machine.

FIG. 5 shows a schematic cross-sectional view of a typical switched reluctance machine. The stator 60 is composed of a stack of laminations of a suitable magnetisable steel, each having a number of identical, magnetically salient poles 61 (in this case six). The stator poles are symmetrically distributed around the inner profile of the lamination. Each pole carries a coil 63 which spans a single pole. The rotor 66 is similarly composed of a stack of laminations of magnetisable steel carrying a number of identical, magnetically salient poles 64 (in this case four). The rotor poles are symmetrically distributed around the outer profile of the lamination. The rotor is mounted on a shaft 68 to allow it to rotate centrally within the stator. There are no windings on the rotor. There is a small airgap between the pole faces of the stator and rotor poles when they are aligned.

Typically, diametrically opposite coils are connected together, either in series or in parallel, to form a phase winding. In FIG. 5, the six stator coils A and A', B and B', C and C' associated with the stator poles would be connected to give three independent phase windings. This machine is also typical in that the number of rotor poles (four) is two fewer than the number of stator poles. This arrangement is frequently designated in the art as a 6/4, 3-phase machine.

Many variations are known. The number of phases can be changed by changing the number of stator poles ($N_s$): the basic rule is that the maximum phase number can be half the number of stator poles, i.e. ($N_s/2$). The number of rotor poles ($N_r$) may also be varied: it is usually taken to be ($N_r=N_s\pm2$) to take advantage of the so-called "vernier" effect but, for particular applications, can be other numbers. Other arrangements result from taking a basic pole combination, e.g., 8/6, and multiplying by an integer to give 16/12, 24/18, . . . etc. The phase inductance cycle of this type of machine is the period of the variation of inductance for the (or each) phase, for example between maxima when the rotor poles and the relevant respective stator poles are fully aligned. The phase inductance cycles of the individual phases are displaced by an angle equal to $360/(q*N_r)$ degrees, where q is the number of phases. This angle is also known as the step angle, $\epsilon$, and is an important property of the machine.

Figure 3A:
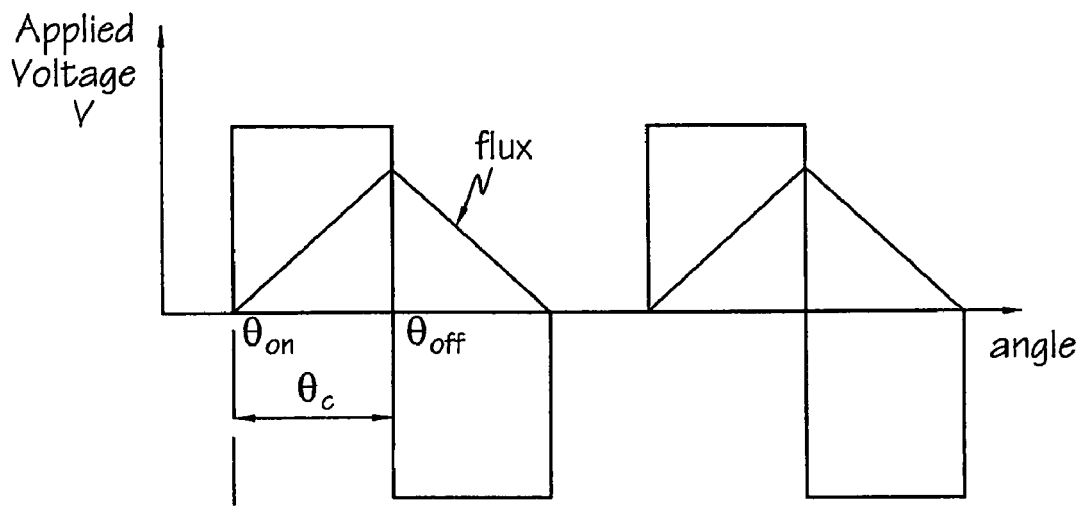
FIG. 3(a) shows phase voltage and flux waveforms for the circuit shown in FIG. 2.
Figure 3B:
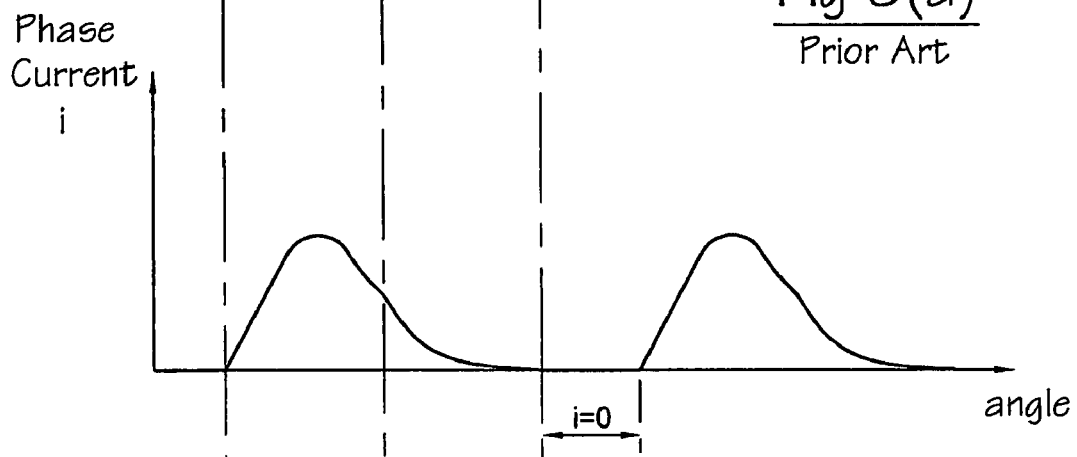
FIG. 3(b) shows the phase current waveform corresponding to FIG. 3(a)
Figure 3C:
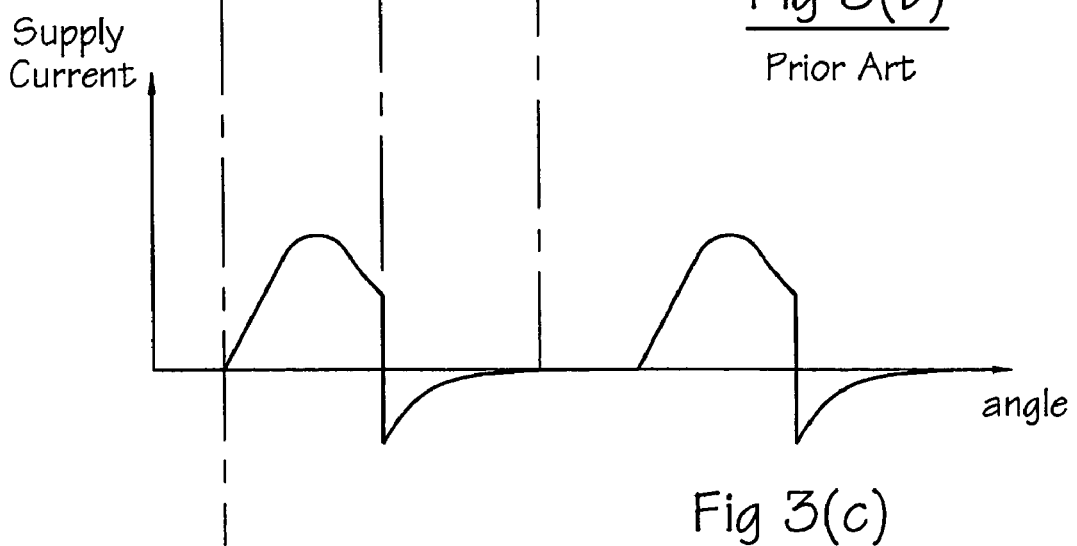
FIG. 3(c) shows the supply current waveform corresponding to FIG. 3(a)

Coils need not be placed on every pole of the machine, and arrangements have been proposed for machines with, e.g., coils on alternate poles. Nevertheless, all these different arrangements exploit the basic property of this genre of machines, i.e. that the doubly salient structure with coils embracing a single pole gives rise to a phase inductance which varies with rotor position. The consequence of this is that the flux in one or more portions of the laminations also varies with angle. If the phases are supplied with "square" pulses of energisation as shown in FIG. 3, then the flux in different portions of the laminations will be of widely differing profiles.

The shape of these waveforms was first set out in the paper: "Variable-speed switched reluctance motors", by Lawrenson, P J; Stephenson, J M; Blenkinsop, P T; Corda, J; and Fulton, N N, IEE Proc, Vol 127, Pt B, No 4, July 1980, pp 253-265 incorporated herein by reference. This paper describes a 3-phase, 6/4 machine similar to that in FIG. 5 where each of the coils A, B & C are connected to produce flux of one polarity and coils A', B' and C' are connected to produce flux of the other polarity. The flux waveforms for this machine are as shown in FIG. 6. These waveforms are drawn on the basis of the machine operating at constant speed in the single-pulse mode of operation. The applied phase voltage is a constant voltage over some arbitrary rotor angle.

Each stator pole experiences four pulses of unidirectional flux per complete rotation of the rotor. The sections of the stator core between the poles (i.e. the back-iron) are subject to a flux waveform which is determined by the polarity of the stator poles on either side of it. The sections of the stator-core between poles A and B, B and C, A' and B', B' and C' each have an alternating waveform as shown at "Stator core flux (1)" in FIG. 6, the individual waveforms being displaced or inverted appropriately. Clearly the detail of this waveform will depend on the width of the block of applied voltage, e.g., when the switch-off point of one phase coincides with the switch-on point of the next, the double peaks disappear to form a flat top. The sections between stator poles of opposite polarity, i.e. C to A' and C' to A, have a waveform as shown at "Stator core flux (2)" in FIG. 6. By contrast, this waveform is unipolar and less dependent on the detail of the energisation. With contiguous energisation of the phases, there is a time invariant waveform in these sections, which, in the steady state, has no iron loss associated with it.

The waveform for each rotor pole has the bipolar pattern shown at "Rotor pole flux" in FIG. 6, i.e. a once-per-revolution low frequency shape with a substantial modulation by higher harmonics. The core of the rotor is that part from which the rotor poles extend. The rotor core carries the flux between the poles as and when they are energised. Each of the rotor core sections has the same waveform of flux, shown at "Rotor core flux" in FIG. 6 and, though it is more complex than the rotor pole flux waveform, shares the same characteristic of a low-frequency pattern with significant higher harmonics. By inspection, it will be seen that there is no width of phase energisation which gives rise to time invariant waveforms in the rotor in the steady state. Thus, the time variation of flux in the rotor core gives rise to "magnetic" loss in the rotor laminations, regardless of the width of energisation demanded by the control system.

Corresponding waveforms can be drawn for the basic pole combinations for machines of higher and lower phase numbers, e.g. 4/2 for 2-phase, 8/6 for 4-phase, etc., but it will be found that in every case there is bipolar flux in the rotor poles and the rotor core which gives rise to magnetic losses. This arises from the fact that each rotor pole faces stator poles of both polarities during a revolution of the rotor.

Bipolar energisation of switched reluctance machines has been proposed for use in certain circumstances. For example, the Turner patent cited above discloses alternate energisation blocks of alternating polarity. This is shown in FIG. 7, where the stator pole flux patterns are shown. These, as expected, now have an alternating pattern with a frequency of double the rotor speed. The rotor pole flux pattern has also increased in frequency and is now three times rotor speed. The two rotor core flux sections have the same waveform (though phase displaced from each other) but has increased its fundamental frequency by a factor of three. The net effect of these changes is that the iron loss in the rotor is significantly increased.

The inventor has appreciated that the flux patterns in the rotor poles can, contrary to the disclosures of the prior art, be made to be unidirectional by a suitable energisation pattern applied to the stator. One way of deducing the pattern is by starting with the required rotor flux pattern and working back to the stator energisation. This process is exemplified in FIG. 8, where the energisation for a 6/4, 3-phase system is shown.

Since it is desired that the rotor pole flux will be unipolar, this is drawn as the starting point, for each of two adjacent poles, as shown in FIG. 8(a) at Rotor pole flux (1) 80 and Rotor pole flux (2) 82. This is the flux carried in a pole which is 'active' in the sense that it is moving into and through substantial alignment with an energised stator pole in either the motoring or the generating mode. FIG. 8(b) shows the machine when the rotor is substantially aligned with Phase A and the nominal flux paths, along one rotor pole 64, through the rotor core and along the other rotor pole 64', and around the stator are shown by the dotted lines. There is symmetry in the geometry and the phase windings, so opposite sections of the magnetic circuit will have identical waveforms (which in some cases will be inverted in polarity). For example, the rotor pole 64' will have an identical flux waveform to that of pole 64, but it will be inverted. The portions of interest in the magnetic circuit in the rotor are shown in FIG. 8(b), i.e. the body of the rotor pole 80; the two adjacent portions of the rotor core 90 and 92; and the rotor pole 82 which will be attracted to Phase B when it is energised. Consideration of these four sections will be sufficient to describe the flux patterns in all the other sections of the rotor, because of the geometric and magnetic symmetry which exists.

Since the flux in the rotor poles has been taken as the starting point, the energisation pattern to produce Rotor pole flux (1) 80 can be determined and is shown at Applied voltage (1) 84 in FIG. 8(a). Similarly, the energisation for the adjacent pole 82 is derived and shown at Applied voltage (2) 86. By combining these two patterns, the total applied voltage 88 is determined.

The energisation pattern required for a single phase now consists of two energisations of one polarity 85, followed by two of the other polarity 87. This, however, is insufficient to define the overall pattern, since the phase displacement of the patterns must also be specified. It will be seen from FIG. 8(a) that the phase displacement between the energisation waveforms for each phase has changed from the +ϵ value of the conventional machine as shown in FIG. 6 to −2ϵ, i.e., from +30° to −60°.

The rotor core flux patterns can now be determined by combining the rotor pole fluxes as the rotor turns (in this case clockwise as indicated by the arrow on the rotor) from the position shown in FIG. 8(*b*) to that in FIG. 8(*c*) and is shown at the bottom of FIG. 8(*a*) for the two possible cases to either side of the rotor shaft 68. By comparing the direction of flux in the portion 90 as the rotor moves between the two positions, it is seen that the flux contributions from the pole portions are in the same direction in portion 90. This is shown in FIG. 8(*a*) for the first two pulses of flux. The whole waveform can be constructed by a similar consideration of each pulse of flux throughout the complete cycle of rotation of the rotor. It will be seen that the waveform Rotor core flux (1) 90 is now unipolar (in contrast to that of the prior art shown in FIGS. 6 and 7) with a small superimposed ripple. The rotor loss associated with this waveform is significantly reduced from that of the prior art conventional bipolar energisation.

By comparing the direction of flux in the portion 92 as the rotor moves between the two positions, it is seen that the flux contributions from the pole portions are in the opposite direction in portion 92. This is shown in FIG. 8(*a*) for the first two pulses of flux. The complete waveform can be constructed as before and it is seen that the waveform Rotor core flux (2) 92 has a fundamental frequency of six times rotor speed, but is not far removed from a sinusoidal form, so will have relatively few harmonics. This contrasts with the harmonic-rich waveform of the prior art FIG. 6 and, for certain values of conduction angle, will also reduce the iron loss. Thus, the flux in the rotor core is a mixture of generally unipolar flux and bipolar flux. The overall reduction in rotor iron loss due to the use of unipolar flux in the rotor poles greatly simplifies the task of cooling the rotor.

The invention is not limited to 3-phase systems. FIG. 9 shows the corresponding waveforms for an 8/6 4-phase system. The step angle, ϵ, is $360/(q*N_r)=15°$ (in contrast to the 30° of the 3-phase system), so 24 steps are required for one rotation of the rotor. With 6 rotor poles, there are the three rotor pole flux waveforms 94, 96, 98 as shown. As before, the polarity of the energisation required to produce each of these unipolar fluxes can be determined by inspection and then combined to give the total applied voltage 100. For, say, Phase A, three pulses of one polarity 102 followed by three pulses of the opposite polarity 104 are required (in contrast to the two-pulse blocks of FIG. 8 for the 3-phase system). The displacement of the four waveforms is seen to be −3ϵ.

FIG. 9 also shows the Rotor core flux (1) and (2) patterns 106 and 108. As for the 3-phase system, one core section carries unipolar flux with a small superimposed ripple, while the other two sections have a pattern which has an offset. It will be noted that the rotor flux patterns of the system with unipolar rotor pole flux are the same as those of the stator with the same number of poles and unipolar stator pole flux, i.e. the rotor flux patterns of a 4-phase 8/6 machine correspond to those of the stator of a 3-phase 6/4 machine.

By introducing bipolar energisation of the correct pattern and phase displacement, the flux waveforms in the rotor poles and core can be manipulated to provide patterns which have a reduced fundamental frequency and/or reduced harmonic content, thus reducing the magnetic loss in the rotor. A suitable circuit for bipolar operation of a reluctance machine, such as that shown in FIG. 5, is shown in FIG. 10, which shows one phase leg of a polyphase converter circuit supplied from a source VDC and DC link capacitor 140. The phase winding 130 of the machine is connected into a full bridge composed of four switches 110-113 and four diodes 118-121. Pairs of switches and diodes are commonly available in pre-assembled modules of two switches and two diodes, as shown by the dashed lines 122 and 123, thus facilitating assembly of the bridge. In some circumstances, complete bridges with all eight devices are available as one module Bipolar energisation is available from other converter circuits, e.g. as disclosed in the Turner patent cited above.

Another benefit of using bipolar energisation will now be described. Each phase winding in an electrical machine of this type is conventionally comprised of diametrically opposite coils connected (in series or in parallel) to drive flux across the rotor and return it around the stator. The direction of the flux, i.e. the polarity of the winding, is a matter of choice, but could be chosen such that adjacent phases have the same polarity, as shown in FIG. 11 for, a 3-phase machine. The coils have been connected so that, if, say, positive voltage is applied to A, B & C in turn, the stator poles will have grouped polarities of NNNSSS around the stator. An alternative scheme is shown in FIG. 12, where the polarity of Phase B is reversed, giving an alternating NSNSNS pattern. To a first order, these arrangements are equivalent, but there are second-order advantages in each. It will be seen that the NNNSSS arrangement has four sections of back-iron which have poles of the same polarity at either side of them, and two sections of poles of opposite polarity. This arrangement has the stator flux patterns of FIG. 6, which was drawn for this configuration. The unipolar waveform of Stator core flux (2) has low iron loss associated with it, so at high speeds, where the conduction angles are wide, this connection generally has the lower loss and therefore the higher efficiency.

With the grouped NNNSSS connection, however, the magnetic balance of the phases relies on magnetic linearity of the back-iron sections. While this may exist at the relatively low flux levels of high-speed operation, it does not exist at low-speed, high-torque conditions where all sections of the magnetic circuits are generally operating deep into magnetic saturation. This results in the phases using magnetic circuits which are no longer identical, so the torque outputs from the phases are no longer equal and the phase currents are unbalanced. This results in a low-frequency pattern being superimposed on the overall torque ripple and may contribute to unwanted acoustic noise.

The alternating NSNSNS connection has a symmetry which results in each back-iron section being identical, so at low speeds it removes the problem of phase asymmetry. At high speeds, however, it results in higher losses, since the unipolar waveforms no longer exist, having been replaced by the bipolar waveforms.

The designer is therefore able to choose which grouped or alternating sequence of polarities of stator poles to adopt. An NNNSSS connection achieves the highest efficiency at high speeds. An NSNSNS connection reduces phase unbalance at high loads at low speeds. The same considerations apply to 5- and 7-phase machines. The matter does not arise to the same extent with an even number of phases, since it is not possible to arrange the phases to give alternate poles of alternating polarity.

However, if bipolar feeding of the phases, is available, then it is possible to select between the patterns and produce either one at any time according to operational requirements. For example, a machine can be changed during operation from a NNNSSS sequence to a NSNSNS sequence simply by reversing the polarity of the energisation applied to Phase B. The machine can therefore be operated in the best connection for a given speed and/or load range. At low speeds it can be operated as NSNSNS to gain the best torque output and at high speeds, where it may well spend most of its operational life, it can be operated as NNNSSS.

The skilled person will appreciate that variation of the disclosed arrangements are possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

What is claimed is:

1. A method of operating a reluctance machine having a stator defining stator poles, the stator having windings which are arranged as at least three separately energisable phases, and a rotor defining rotor poles, the method comprising: energising the windings such that the flux in each of the rotor poles is unipolar for successive energisations of the windings when the rotor poles are in substantial alignment with the energised stator poles, wherein the flux is unipolar for successive energisations such that a unipolar direction for the flux is maintained through each of the corresponding rotor poles for a complete cycle of rotation of the rotor.

2. A method as claimed in claim 1 wherein the energising includes energising 2n stator poles per phase, where n is a positive integer.

3. A method as claimed in claim 1, in which the machine has six stator poles, four rotor poles and three separately energisable phases, and the energising includes using an energisation pattern for each phase that includes two pulses of energisation of one polarity and two pulses of energisation of the other polarity.

4. A method as claimed in claim 3, wherein the energising is carried out so that the phase displacement between the energisation patterns of the phases is twice the step angle of the machine.

5. A method as claimed in claim 1, in which the machine has eight stator poles, six rotor poles and four separately energisable phases, and the energising includes using an energisation pattern for each phase that includes three pulses of energisation of one polarity and three pulses of energisation of the other polarity.

6. A method as claimed in claim 5, wherein the energising is carried out so that the phase displacement between the energisation patterns of the phases is three times the step angle of the machine.

7. A method as claimed in claim 1 in which the machine has q phases, where q is three or more, wherein the energising includes selecting energisation patterns of the stator windings such that a selected phase is energised according to one polarity for a number of energisations greater or less than q and then energised for the same number of energisations according to the other polarity.

8. A method as claimed in claim 7 wherein the energising is carried out so that the selected phase is energised according to one polarity for q−1 energisations and is energised according to the other polarity for the subsequent q−1 energisations.

9. A method as claimed in claim 1 wherein the energising of the phases is carried out such that the flux in the stator poles is bipolar.

10. A method of operating a reluctance machine comprising energising the stator poles according to a first pattern of energisation polarities of the phases, changing the pattern of energisations while the machine is operating, and energising the windings according to a second pattern of energisation of the phases, wherein the changing of the pattern includes the pattern being changed between alternating polarities of stator poles to groups of stator poles of the same polarity.

11. A method as claimed in claim 10 wherein the changing of the pattern of energisations is carried out as a function of the speed of the machine.

* * * * *